(12) United States Patent
Barnes

(10) Patent No.: US 7,543,829 B1
(45) Date of Patent: Jun. 9, 2009

(54) THREE WHEEL COASTER CYCLE

(76) Inventor: Danny Barnes, 9411 Padgett Switch Rd., Irvington, AL (US) 36544

( * ) Notice: Subject to any disclaimer, the term of this patent is extended or adjusted under 35 U.S.C. 154(b) by 508 days.

(21) Appl. No.: 11/500,086

(22) Filed: Aug. 7, 2006

Related U.S. Application Data

(63) Continuation-in-part of application No. 11/165,746, filed on Jun. 24, 2005, now abandoned.

(51) Int. Cl.
*B62D 61/08* (2006.01)
(52) U.S. Cl. .................... 280/62; 280/87.021; 280/282; 180/210
(58) Field of Classification Search ............. 280/87.01, 280/87.021, 87.03, 87.042, 87.043, 47.11, 280/211, 62, 282; 180/210, 211, 215, 216
See application file for complete search history.

(56) References Cited

U.S. PATENT DOCUMENTS

| | | | |
|---|---|---|---|
| 3,605,929 A * | 9/1971 | Rolland | ...................... 180/208 |
| 4,020,914 A | 5/1977 | Trautwein | |
| 4,072,325 A | 2/1978 | Bright et al. | |
| 4,088,199 A | 5/1978 | Trautwein | |
| 4,159,752 A * | 7/1979 | Kanno | ........................ 180/210 |
| 4,375,293 A * | 3/1983 | Solbes | ....................... 280/22.1 |
| 4,469,344 A | 9/1984 | Coil | |
| RE32,031 E | 11/1985 | Winchell | |
| 4,624,469 A | 11/1986 | Bourne, Jr. | |
| 4,903,857 A | 2/1990 | Klopfenstein | |
| 5,040,812 A * | 8/1991 | Patin | ........................... 280/62 |
| 5,431,243 A | 7/1995 | Richards | |
| 5,611,555 A * | 3/1997 | Vidal | ......................... 280/282 |
| 5,762,351 A | 6/1998 | SooHoo | |
| 6,367,824 B1 * | 4/2002 | Hayashi | ....................... 280/62 |
| 6,390,216 B1 * | 5/2002 | Sueshige et al. | ......... 180/65.51 |
| 6,402,174 B1 | 6/2002 | Maurer | |
| 6,581,947 B2 | 6/2003 | Andrews | |
| 6,817,617 B2 | 11/2004 | Hayashi | |
| 7,438,297 B2 * | 10/2008 | Fernandez et al. | ....... 280/14.27 |

* cited by examiner

*Primary Examiner*—Christopher P Ellis
*Assistant Examiner*—John D Walters
(74) *Attorney, Agent, or Firm*—George L. Williamson

(57) ABSTRACT

The present invention discloses a coaster cycle having a front half which works similarly to a bicycle wherein it has handle bars that turn the front wheels. The front wheel turns left and right and also leans in both a left and right direction. The front wheel leans left to right and is connected to the rear wheels by a frame having multiple pivotal couplings so that the rear wheels lean left or right with exactly the same angle as the front wheels. The leaning of the front and rear wheels in concert gives the frame a unique design which allows it to make left and right high G-force turns in a very stable manner. Additional embodiments are disclosed which comprise twin, internal combustion engines being placed on the rear wheels of the vehicle in order to power the vehicle which also have independent thumb control throttles for controlling the rear wheels individually. An additional embodiment comprises having snow skis attached to the underside of the vehicle to allow it to be used on snow and also having ice-skate like members attached to the underside of the vehicle to allow it to be used on ice.

11 Claims, 5 Drawing Sheets

THREE WHEEL COASTER CYCLE

RELATED APPLICATIONS

This is a Continuation-In-Part of U.S. patent application Ser. No. 11/165,746 filed on Jun. 24, 2005 now abandoned by the applicant.

BACKGROUND OF THE INVENTION

1. Field of the Invention

The present invention relates generally to cycles and, more particularly, is concerned with a three-wheeled cycle that can be used by a person for coasting thereon.

2. Description of the Prior Art

Three-wheeled cycles have been described in the prior art. However, none of the prior art devices disclose the unique features of the present invention.

In U.S. Pat. No. 5,762,351, dated Jun. 9, 1998, Soohoo disclosed a multi-track vehicle. In U.S. Pat. No. 5,611,555, dated Mar. 18, 1997, Vidal disclosed an articulated balancer. In U.S. Pat. No. 6,817,617, dated November 2004, Hayashi disclosed a tricycle. U.S. Pat. No. 6,581,947 to Andrews, et al. dated June 2003, disclosed the steerage of a vehicle. U.S. Pat. No. 6,402,174 to Maurer, dated June 2002, disclosed a recumbent tricycle with controlled wheel and body lean. U.S. Pat. No. RE 32,031 to Winchell, dated November 1985, disclosed a cambering vehicle. U.S. Pat. No. 4,072,325, dated February 1978 to Bright, et al., disclosed a pendulum stabilized, ground vehicle.

In U.S. Pat. No. 4,020,914, to Trautwein dated May 3, 1977, a three-wheeled motorcycle was described in which two front wheels are interconnected with a conventional motorcycle frame by a parallelogram configured coupling assembly utilizing a pair of cross members pivotally connecting hubs of the front wheels and pivotally connected to the frame. Foot resting platforms are positioned on either side of the motorcycle, being fixedly connected to one of the cross members in the front and pivotally connected to the motorcycle frame at the rear.

In U.S. Pat. No. 4,088,199 to Trautwein dated May 9, 1978, a three-wheeled motorcycle was described in which two front wheels are interconnected with a conventional motorcycle frame by a parallelogram configured coupling assembly utilizing a pair of cross members pivotally connecting hubs of the front wheels and pivotally connected to the frame. Foot resting platforms are positioned on either side of the motorcycle, being fixedly connected to one of the cross members in the front which is pivotally connected to the motorcycle frame.

In U.S. Pat. No. 4,469,344, dated Sep. 4, 1984, Coil disclosed a three-wheeled vehicle in which the frame of a two-wheeled vehicle is pivotally interconnected with an assembly comprising two laterally positioned, steerable front wheels. In addition to causing the front wheels to turn, the rotational movement of the steering shaft having an integrally constructed spiral track simultaneously causes the frame to tilt by utilizing one end of an arm pivotally connected to the front wheel axle and the other end pivotally connected to tracking means for following the rotatable spiral track.

In U.S. Pat. No. 4,624,469 dated Nov. 25, 1986, to Bourne, Jr. a three-wheeled vehicle was described with a steering mechanism configured and arranged to provide driver-controlled wheel and body lean as the vehicle is making a turn. A cradle is rotatably mounted at the front of the vehicle for rotation about an axis generally longitudinal relative to the body. An axle connected to the cradle is perpendicular to the axis of rotation of the cradle and a spindle is pivotally connected to each end of the axle. A wheel is rotatably mounted on each spindle. A tie rod pivotally connected at its ends to the spindles is held in a selected position about the axis of the axle by a tie rod linkage. A coupler rotatably connects the linkage to the body. The linkage is also rotatably connected to the axle for rotation about an axis perpendicular to the axle to move the tie rod laterally. When the linkage is disposed to hold the tie rod forward of the axle, a force causing rotation of the movement of the tie rod laterally produces a conventional turning effect. When the linkage is disposed to hold the tie rod vertically above the axle, movement of the tie rod laterally causes the body to rotate about its connection to the cradle by virtue of the coupler, and causes the wheels to lean, producing simultaneous wheel and body lean. Locating the linkage to hold the tie rod in an intermediate position produces a combined leaning and turning effect.

In U.S. Pat. No. 4,903,857, to Klopfenstein dated Feb. 27, 1990, a three-wheeled vehicle was described with two, steerable front wheels and a driven rear wheel which may be either rider- or motor-powdered, includes steering/coupling linkage disposed adjacent to the lower end of a steering column having a handlebar attached to its upper end. The steering/coupling linkage pivotally couples a forward frame to a rear frame which supports the rider and includes the rear wheel and its means for propulsion. The steering/coupling linkage includes a pivot shaft, a bearing housing and a mechanical connection for leaning the rear frame in the direction of a turn so as to compensate for centrifugal force encountered in turning the vehicle. The mechanical connection causes the rear frame to lean in a controlled relationship to the amount of rotation of the steering shaft, within rotational limits, to emulate the leaning action of a conventional bicycle when making a turn.

In U.S. Pat. No. 5,431,243, to Richards dated Jul. 11, 1995, three-wheeled vehicles were described which has two front wheels and one rear wheel. The front wheels are driven. Both front and rear wheels are steered. A novel steering linkage causes the vehicle to steer with directionally conventional response to a steering input, in that the direction of turning a steering wheel or bar is also the direction in which the vehicle turns. A rear axle assembly provides uncomplicated construction accommodating both the steering and a spring and shock absorber type suspension. In a first embodiment, bodywork covers the front of the vehicle, spanning both front wheels. In a second embodiment, bodywork is extended to envelope substantially the entire vehicle.

In U.S. Pat. No. 5,762,351, to SooHoo dated Jun. 9, 1998, a multi-track vehicle was described having a lean drive and locking system which is primarily activated when the direction of the vehicle is changed by steering so as to provide increased stability, rideability and efficiency of operation. The leanable multi-track vehicle has a main chassis for carrying an operator which is supported on at least three wheels which are spaced from each other, at least a pair of the wheels are located transversely to each other with respect to said main chassis. A subframe supports the pair of wheels from the main chassis such that the main chassis may lean with respect to the said subframe and the pair of wheels. A drive system is provided for leaning the main chassis with respect to the subframe, and a locking device is provided which locks the position of the main chassis with respect to the frame or prevents the main chassis from leaning in one direction or the other with respect to the subframe.

While these wheeled cycles may be suitable for the purposes for which they were designed, they would not be as suitable for the purposes of the present invention, as hereinafter described.

SUMMARY OF THE PRESENT INVENTION

The present invention discloses a coaster cycle having a front half which works similarly to a bicycle wherein it has handle bars that turn the front wheels. The front wheel turns left and right and also leans in both a left and right direction. The front wheel leans left to right and is connected to the rear wheels by a frame having multiple pivotal couplings so that the rear wheels lean left or right with exactly the same angle as the front wheels. The leaning of the front and rear wheels in concert gives the frame a unique design which allows it to make left and right high G-force turns in a very stable manner. Additional embodiments are disclosed which comprise twin, internal combustion engines being placed on the rear wheels of the vehicle in order to power the vehicle which also have independent thumb control throttles for controlling the rear wheels individually. An additional embodiment comprises having snow skis attached to the underside of the vehicle to allow it to be used on snow and also having ice-skate like members attached to the underside of the vehicle to allow it to be used on ice.

An object of the present invention is to provide a three-wheeled cycle. Another object of the present invention is to provide a three-wheeled cycle wherein the front half operates similarly to a bicycle. Another object of the present invention is to provide a cycle wherein the front and rear wheels lean in such a way that allows the cycle to be very stable as it goes around curves. A further object of the present invention is to provide gasoline engines for powering the rear wheels independently. An additional object is to provide snow skis to the underside of the vehicle so it can be used on snow and for providing ice skate-like members to the underside of the vehicle to allow it to be used on ice.

Additional objects of the present invention will appear as the description proceeds.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
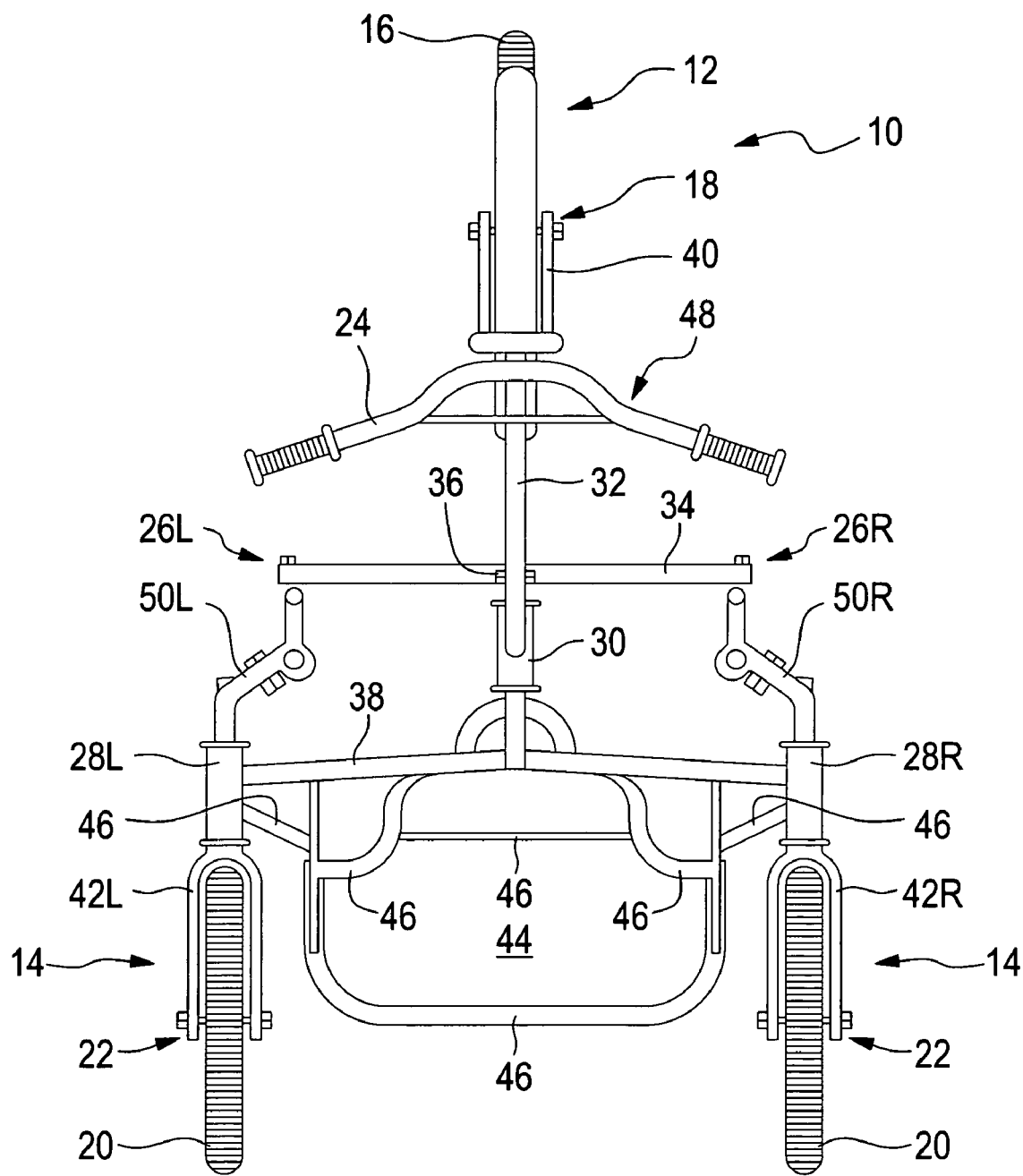
FIG. 1 is a plan view of one embodiment of the present invention.

With regard to reference numerals used, the following numbering is used throughout the drawings.

10 present invention
12 front wheel assembly
14 rear wheel assembly
16 front tire
18 front wheel spindle
20 rear tire
22 rear wheel spindle
24 handle bar
26L left front pivot
26R right front pivot
28L left rear pivotal coupling
28R right rear pivotal coupling
30 central pivotal coupling
32 frame
34 front or second cross member
36 pivot point
38 rear or first cross member
40 front fork
42L left rear fork
42R right rear fork
44 rider platform
46 rider platform frame supports
48 first pivotal coupling
50L left link
50R right link
52L left internal combustion engine
52R right internal combustion engine
54 air intake
56 carburetor throttle
58 exhaust
60 drive gear
62 chain
64 rear wheel sprocket
66L left thumb throttle control
66R right thumb throttle control
68L left throttle cable
68R right throttle cable
70F front snow ski
70L left snow ski
70R right snow ski
72 snow ski brace
74 shock absorber
76F front ice skate member with blade
76L left ice skate member with blade
76R right ice skate member with blade
78 ice skate brace
80 blade

DETAILED DESCRIPTION OF THE PREFERRED EMBODIMENT

The following discussion describes in detail one embodiment of the invention. This discussion should not be construed, however, as limiting the invention to those particular embodiments since practitioners skilled in the art will recognize numerous other embodiments as well. For a definition of the complete scope of the invention, the reader is directed to the appended claims. FIGS. 1 through 6B illustrate the present invention wherein a three-wheeled coaster cycle is disclosed.

Turning to FIG. 1, therein is shown the present invention 10 having a single front wheel assembly 12 and a pair of rear wheel assemblies 14. The present invention is generally configured as a tricycle. The front wheel assembly has a tire 16 which is rotably connected to a front spindle 18 and the rear wheel assembly 14 has two rear tires 20 which are each rotably connected to a rear wheel spindle 22. Also shown is a handle bar 24 which has a left and right end which is to be grasped by the hands of a user. Also shown are right and left pivot members 26 L and 26 R on each end of a substantially horizontal second cross member 34 along with substantially horizontal rear pivotal coupling members 28L and 28R and a central pivotal coupling member 30. Also shown is frame 32 along with a substantially horizontal front cross member 34 having a central pivot point 36 thereon. Frame 32 connects a substantially vertical first pivotal coupling 48 and the substantially horizontal central pivotal coupling 30. A substantially horizontal rear or first cross member 38 is also shown which fixedly connects both rear pivotal couplings 28L, 28R. Also shown is the front fork 40 along with 42L and 42R being the left and right rear forks. Also shown are a rider platform 44 disposed on the rear of the coaster cycle 10 being connected to the coaster cycle by a plurality of frame members 46. The present invention 10 discloses a coaster cycle having a front portion which works similarly to a bicycle wherein it has handle bars 24 that turn the front wheel 12. The front wheel 12 turns left and right and also leans in both a left and right direction and is connected by a plurality of pivots to the rear wheels 14 so that the rear wheels lean left or right with exactly the same angle as the front wheels. The leaning of the front 12 and rear wheels 14 in concert gives the frame a unique design which allows it to make left and right turns in a very stable manner and at relatively high speeds. Each pivotal coupling 28L, 28R, 30, 48 has a bore therein for rotatably receiving a member so that the member could pass through as would be done in the conventional manner by one skilled in the art. Also shown are links 50L and 50R which have an upper end pivotally connected to each end of cross-member 34 and a lower end fixedly connected to rear pivotal couplings 28L and 28R, respectively. Also shown is a platform 44 and supporting frame 46 therefor being disposed on the rear of the frame 32 for supporting a user thereon to permit a user to ride on the cycle and to push the cycle in a forward direction.

Figure 2:
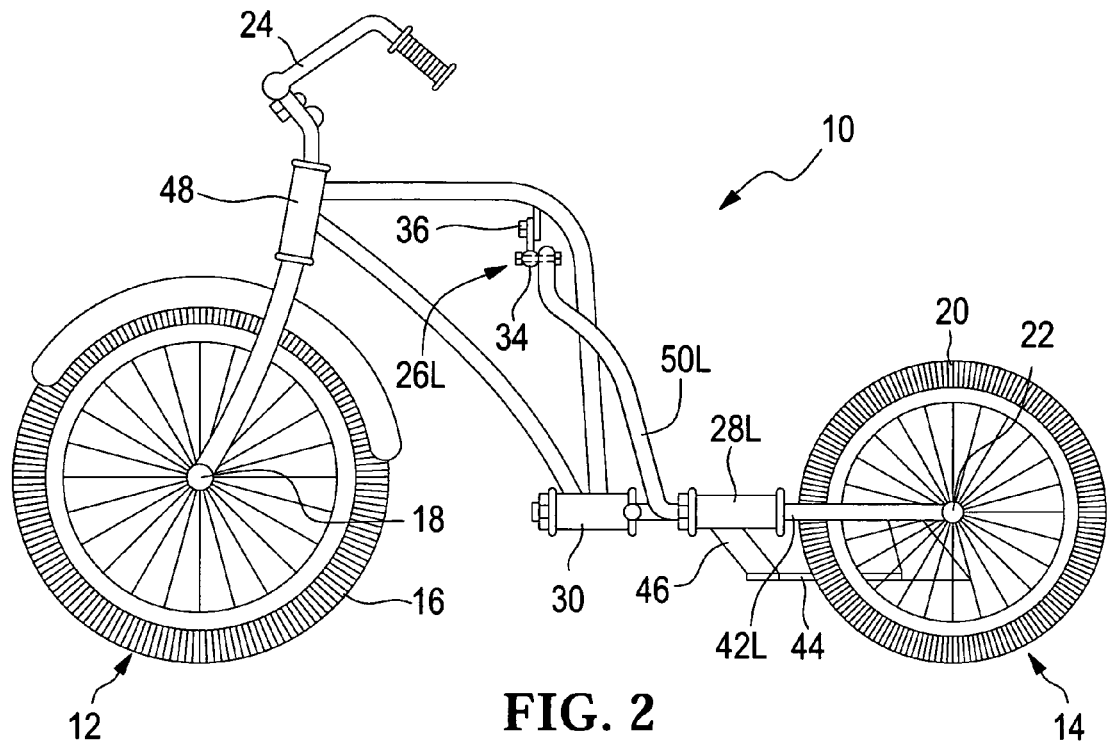
FIG. 2 is a side elevation view of one embodiment of the present invention.

Turning to FIG. 2, therein is shown the present invention 10 having a single front wheel assembly 12 and a pair of rear wheel assemblies 14. The front wheel assembly has a tire 16 which is rotably connected to a front spindle 18 and the rear wheel assembly 14 has two rear tires 20 which are each rotably connected to a rear wheel spindle 22. Also shown is a handle bar 24 which has a left and right end which is to be grasped by the hands of a user and a first pivotal coupling 48. Also shown are left pivot member 26 L along with a rear pivotal coupling member 28L and a central pivot member 30. Also shown is frame 32 along with front cross member 34 having a central pivot point 36 thereon. Also shown is the front fork 40 along with 42L being the left rear fork. Platform 44 and supports 46 are also shown. Also shown are links 50L and 50R (not visible) which have an upper end pivotally connected to each end of cross-member 34 and a lower end fixedly connected to rear pivotal couplings 28L and 28R (not visible), respectively.

Figure 3:
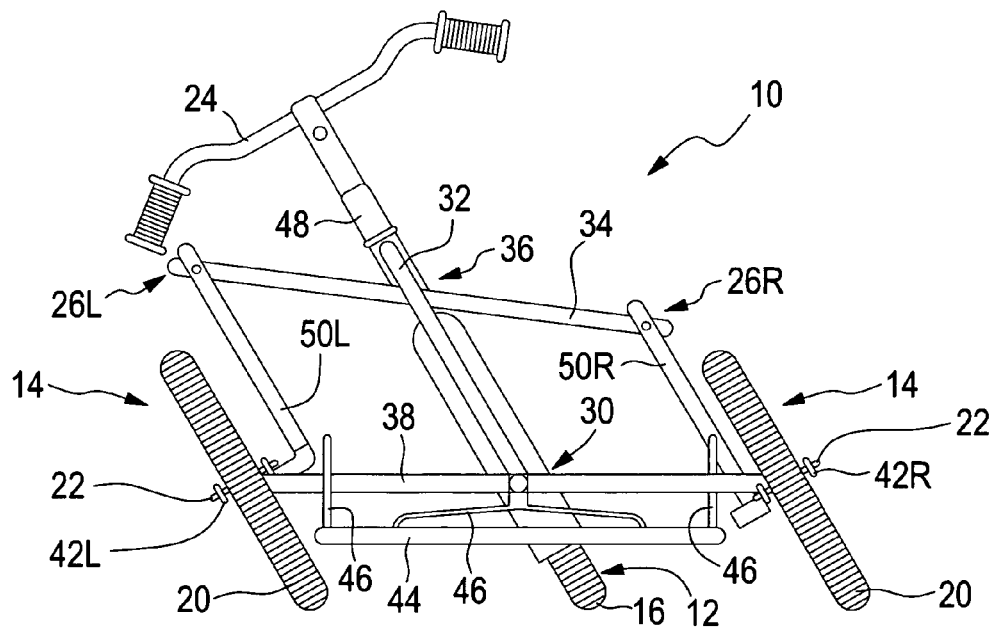
FIG. 3 is rear elevation view of one embodiment of the present invention.

Turning to FIG. 3, therein is shown the present invention 10 having a single front wheel assembly 12 and a pair of rear wheel assemblies 14. The front wheel assembly has a tire 16 which is rotably connected to a front spindle and the rear wheel assembly 14 has two rear tires 20 which are each rotably connected to a rear wheel spindle 22. Also shown is a handle bar 24 which has a left and right end which is to be grasped by the hands of a user and a first pivotal coupling 48. Also shown are right and left pivot members 26 L and 26 R along with rear pivotal coupling members and a central pivotal coupling member 30. Also shown is frame 32 along with front cross member 34 having a central pivot point 36 thereon being sized so that the ends of member 34 are extended laterally an effective distance to stabilize the frame and rear wheel assemblies 14. A rear or first cross member 38 is also shown. Also shown are 42L and 42R being the left and right rear forks. Platform 44 and supports 46 are also shown. In operating, the present invention 10 discloses a coaster cycle having a front portion which works similarly to a bicycle wherein it has handle bars 24 that turn the front wheel 12 to the left or right. However, when the front wheel 12 turns a plurality of pivots also allow the rear wheels 14 to turn at the same angle with respect to the ground so that frame 32 leans to the left or right with respect to the ground. Also shown are links 50L and 50R which have an upper end pivotally connected to each end of cross-member 34 and a lower end fixedly connected to rear pivotal couplings 28L and 28R (neither visible), respectively. Note that platform 44 stays in substantially the horizontal plane at all times when the present invention leans to the left or right which is possible because the pivotal couplings 28L, 28R, 30 are disposed in substantially the same plane so the rear wheels do not move up or down. Also, platform 44 is wide enough to accommodate a rider and links 50L, 50R are disposed an effective distance laterally of frame 32.

Figure 4A:
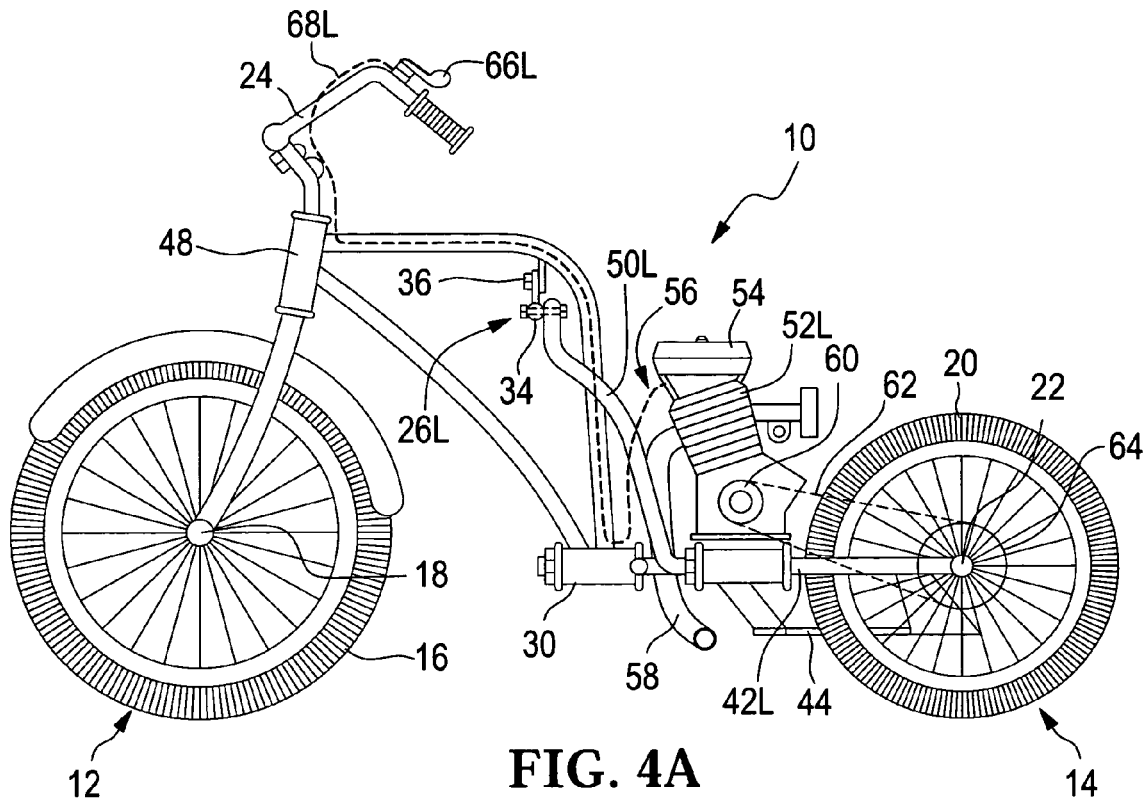
FIG. 4A is a side elevation view of one embodiment of the present invention.
Figure 4B:
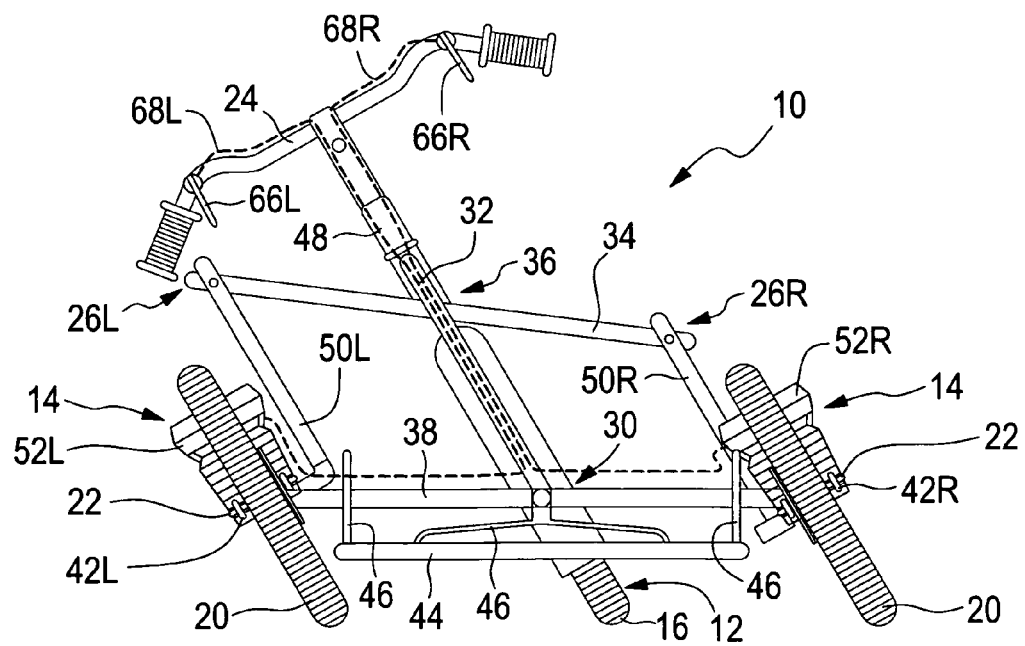
FIG. 4B is a rear elevation view of one embodiment of the present invention.

Turning to FIGS. 4A and 4B, therein is shown the present invention 10 having internal combustion engines 52L, 52R so that one engine 52L is attached to the left rear wheel and a second engine 52R is attached to the right rear wheel so that each wheel is independently powered. Each engine 52L, 52R has an air intake 54, carburetor throttle 56, exhaust 58, drive gear 60, chain 62 and rear wheel sprocket 64. Each engine has a separate thumb throttle control 66L, 66R so that each control have independent throttle cables 68L, 68R which connect the thumb throttle controls to the carburetor throttle 56 of the internal combustion engines 52L, 52R. The engines 52L, 52R, are independently controlled in order to provide additional steering capacity to the present invention 10 and in order to impart a more enhanced, exciting, pleasurable ride for the user by making the vehicle 10 more versatile. The engines 52L, 52 R are mounted onto the respective couplings 28L, 28R so that the engines move in unison with the couplings so that the drive gears and chains stay in alignment with each of the rear wheels.

Figure 5A:
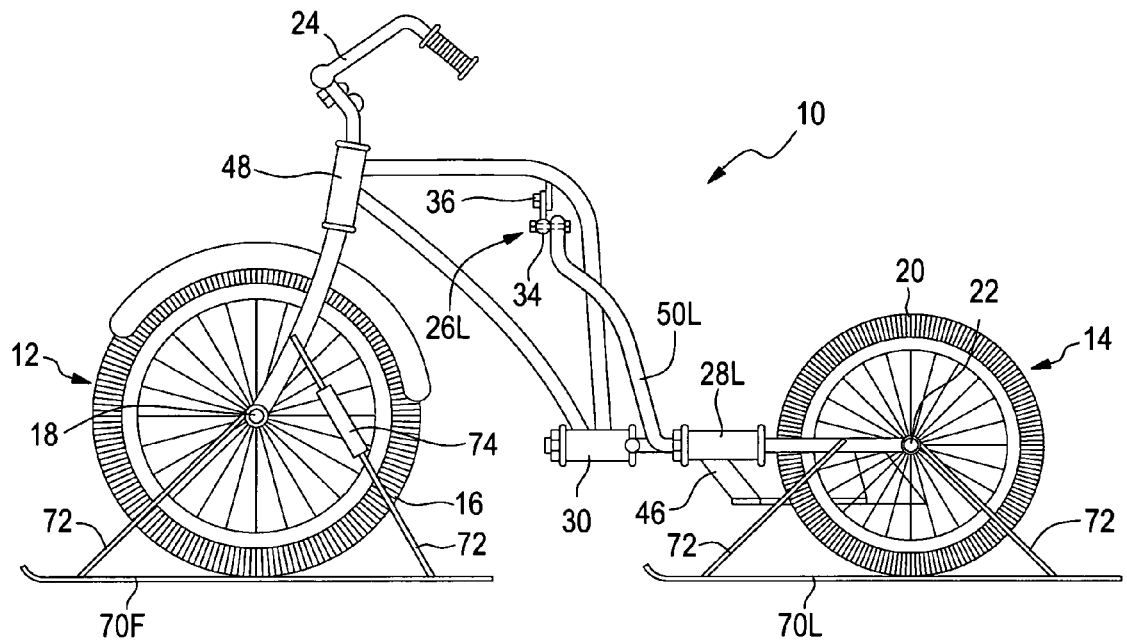
FIG. 5A is a side elevation view of one embodiment of the present invention.
Figure 5B:
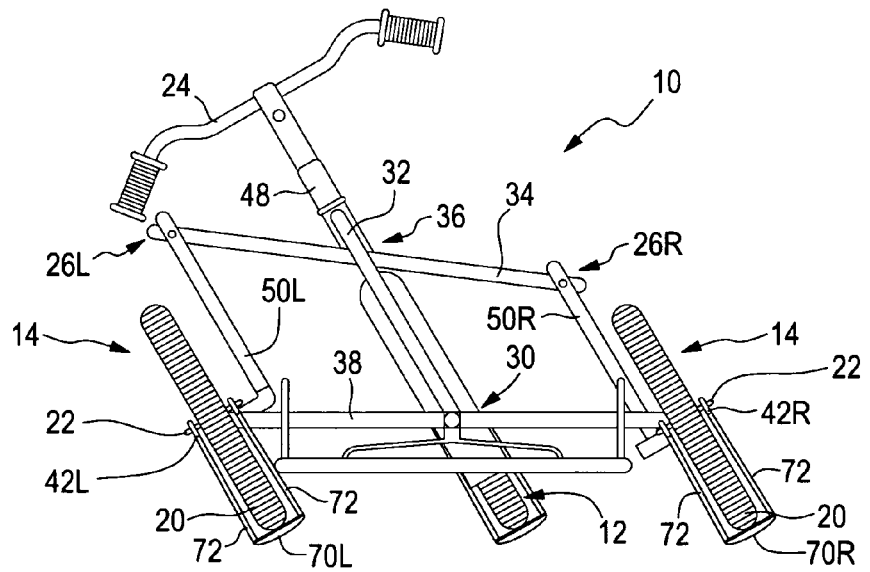
FIG. 5B is a rear elevation view of one embodiment of the present invention.

Turning to FIGS. 5A and 5B, therein is shown the present invention 10 having snow skis 70F, 70L, 70R attached to the front wheel and each of the rear wheels. Each snow ski 70F, 70L, 70R has a plurality of snow ski braces 72 wherein the front snow ski brace for the front wheel 12, and maybe the rear wheel, has a shock absorber 74 built therein. Note that the front wheel 12 has one snow ski and the rear wheels 14 each have snow skis attached thereto. The snow ski members 70F, 70L, 70R allow the present invention 10 to be used on snow-covered surfaces.

Figure 6A:
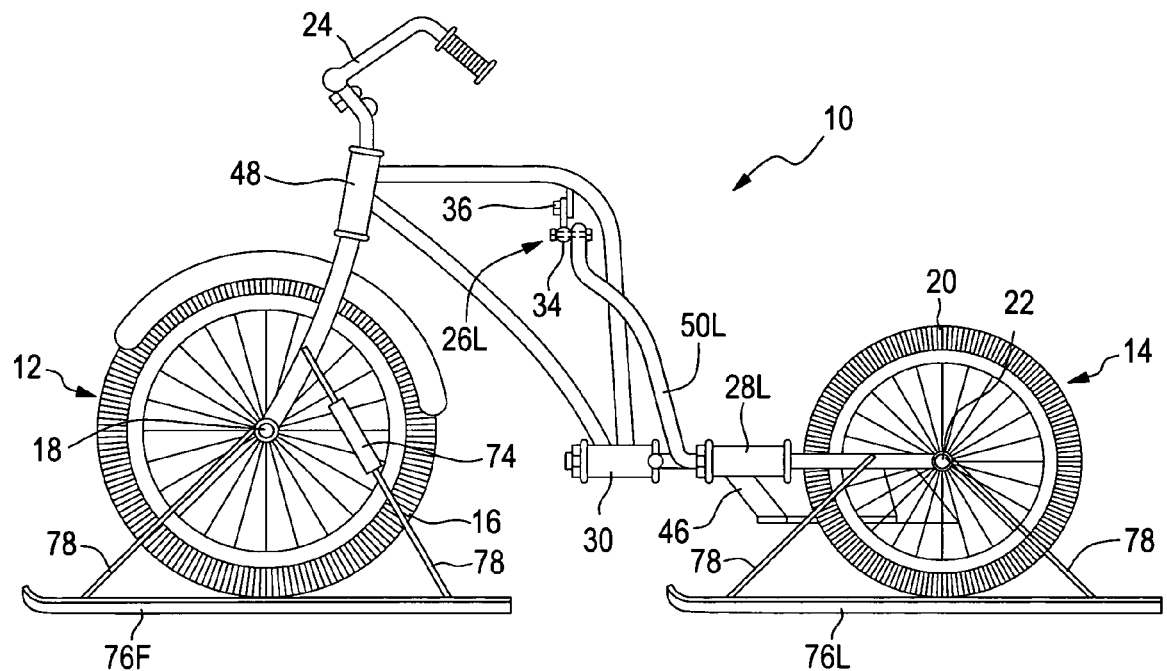
FIG. 6A is a side elevation view of one embodiment of the present invention.
Figure 6B:
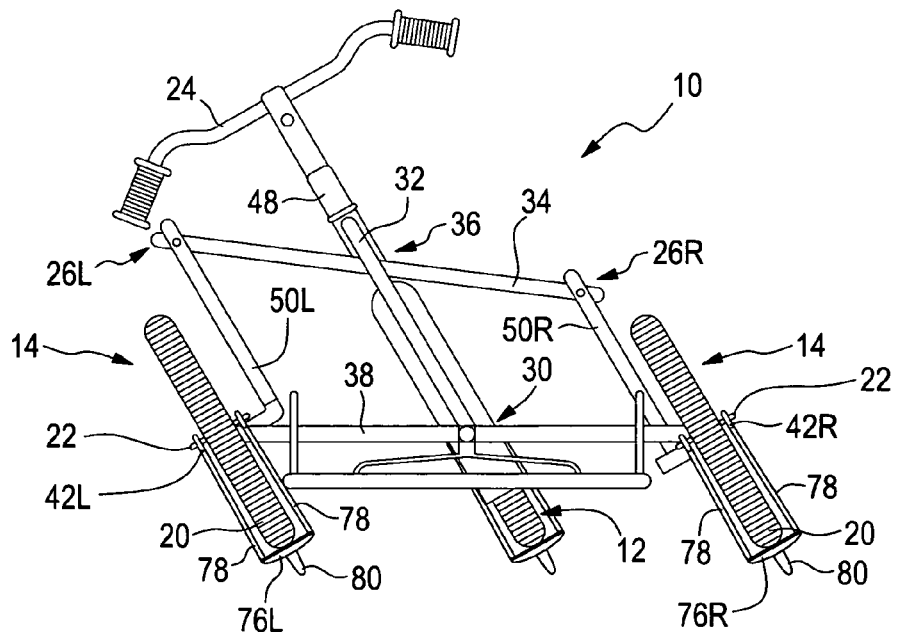
FIG. 6B is a rear elevation view of one embodiment of the present invention.

Turning to FIGS. 6A and 6B, therein is shown the present invention 10 having an ice-skate like member 76F, 76L, 76R having a blade 80 thereon attached to the front and rear wheels. The ice skate member attached to the front wheel has a shock absorber 74 placed in the brace 78 in order to minimize shock from the front wheel of the vehicle. Braces for the ice skate members 76F, 76L, 76R are shown at 78. A front wheel 12 has a single ice skate member 76F wherein each of the rear wheels has an ice skate member 76L, 76R attached thereto. The purpose of the ice skate members 76F, 76L, 76R is to allow the present invention 10 to be used on ice surfaces.

I claim:

1. A cycle useful by a person for coasting thereon, comprising:
   a) a frame having front and rear ends;
   b) a front wheel assembly being disposed on said front end of said frame, wherein said front wheel assembly can turn to the left and right, wherein said front wheel assembly can lean to the left and right when the cycle is moving forward, wherein said front wheel assembly comprises one wheel;
   c) a handle bar being disposed on said front of said frame, said handle bar being interconnected to said front wheel assembly so that a user can grasp said handle bar and turn said front wheel assembly to the left or to the right;
   d) a rear wheel assembly being disposed on said rear end of said frame, wherein said rear wheel assembly can lean to the left or to the right when the cycle is moving forward, wherein said rear wheel assembly leans to the left or the right with the same angle with respect to the ground as said front wheel assembly, wherein said rear wheel assembly comprises first and second wheels;
   e) means for connecting said rear wheel assembly to said frame whereby the rear wheel assembly can lean left and right at the same angle, with respect to ground, as the front wheel assembly; and,
   f) a platform being disposed on said rear of said frame for supporting a user thereon to permit a user to ride on the cycle and to push the cycle in a forward direction, wherein said platform is disposed in substantially the horizontal plane as said front wheel assembly leans to the left or right, wherein said platform is effective wide to allow the person to stand on said platform while using the cycle.

2. The cycle of claim 1, wherein said front wheel assembly further comprises a substantially vertical front fork having upper and lower ends, a spindle for rotatably receiving a rim having a tire thereon being disposed on said lower end of said front fork, wherein said handle bars are disposed on said upper end of said front fork, a substantially vertically disposed first pivotal coupling being disposed on said front end of said frame, said first pivotal coupling having a bore therethrough so that said front fork can pass through said bore of said first pivotal coupling so that said front fork can turn to the left or the right, wherein said first pivotal coupling is disposed between said lower end of said front fork and said handle bars.

3. The cycle of claim 2, wherein said front end of said frame is connected to said first pivotal coupling, wherein said frame extends toward said rear and curves downward so as to terminate at a connecting point of said frame to a second pivotal coupling positioned in front of and intermediate said first and second wheels, wherein said frame can pivot to the left or to the right in said second pivotal coupling, wherein said second pivotal coupling is substantially horizontally disposed.

4. The cycle of claim 3, wherein each of said rear wheel assemblies further comprises a substantially horizontally disposed rear fork having front and rear ends, a spindle for rotatably receiving a rim having a tire thereon being disposed on said rear end of each said rear fork, a substantially horizontally disposed third and fourth pivotal coupling being disposed on said front end of each said rear fork, said third and fourth couplings each having a bore therethrough so that said front of each said rear fork can pass through said bore of said third and fourth pivotal couplings so that said rear fork can turn to the left or the right.

5. The cycle of claim 4, wherein said second, third and fourth pivotal couplings are disposed in substantially the same horizontal plane so that said pair of rear wheels are fixed in relation to the vertical plane and are prevented from moving up or down.

6. The cycle of claim 5, further comprising a first substantially horizontally disposed cross member that fixedly connects said third and fourth couplings so as to stabilize said third and fourth couplings.

7. The cycle of claim 6, further comprising a second substantially horizontally disposed cross member having first and second ends, wherein each of said first and second ends are disposed an effective distance laterally of said frame to provide stability to said frame, wherein the midpoint of said second cross member is pivotally connected to said frame between said front and rear end of said frame, a first and second substantially vertically disposed link each having upper and lower ends, wherein said upper end of each said first and second link are pivotally connected to said first and second ends, respectively, of said second cross member, wherein said lower end of each said first and second link are fixedly connected to said third and fourth pivotal coupling, respectively, so that as said frame leans to the left or the right said second cross member pivots at its midpoint with respect to said frame and said first and second ends of said second cross members each pivot with respect to each said upper end of said first and second link, respectively.

8. The cycle of claim 7, further comprising an internal combustion engine being disposed on each of said rear wheel assemblies to provide power to each said rear wheel assembly independently of each other.

9. The cycle of claim 8, further comprising a pair of thumb operated throttle controls disposed on said handle bar so that each internal combustion engine can be controlled by the person.

10. The cycle of claim 7, further comprising snow skis being disposed on said front and rear wheel assemblies so that the cycle can be operated on snow, wherein said front snow ski comprises a shock absorber.

11. The cycle of claim 7, further comprising ice skate-like members being disposed on said front and rear wheel assemblies so that the cycle can be operated on ice, wherein said front ice skate-like member comprises a shock absorber.

* * * * *